(12) United States Patent
Seta

(10) Patent No.: US 6,987,534 B1
(45) Date of Patent: Jan. 17, 2006

(54) BRIGHTNESS ADJUSTING APPARATUS FOR STEREOSCOPIC CAMERA

(75) Inventor: Itaru Seta, Mitaka (JP)

(73) Assignee: Fuji Jukogyo Kabushiki Kaisha, Tokyo-To (JP)

(*) Notice: Subject to any disclaimer, the term of this patent is extended or adjusted under 35 U.S.C. 154(b) by 987 days.

(21) Appl. No.: 09/650,705

(22) Filed: Aug. 29, 2000

(30) Foreign Application Priority Data

Aug. 30, 1999 (JP) .......................... 11-242527

(51) Int. Cl.
*H04N 5/235* (2006.01)

(52) U.S. Cl. ..................... 348/229.1; 348/42
(58) Field of Classification Search ............. 348/229.1, 348/255, 67 B, 221.1, 42, 47, 43; 353/7; 352/57; 376/322, 324, 325
See application file for complete search history.

(56) References Cited

U.S. PATENT DOCUMENTS

| | | | |
|---|---|---|---|
| 5,142,357 A * | 8/1992 | Lipton et al. | 348/48 |
| 5,650,944 A | 7/1997 | Kise | |
| 6,310,546 B1 * | 10/2001 | Seta | 382/104 |
| 6,552,742 B1 * | 4/2003 | Seta | 348/42 |
| 6,813,370 B1 * | 11/2004 | Arai | 382/104 |

FOREIGN PATENT DOCUMENTS

| | | |
|---|---|---|
| EP | 0 933 646 A2 | 8/1999 |
| JP | 1-177795 | 7/1989 |
| JP | 5-114099 | 5/1993 |
| JP | 5-265547 | 10/1993 |
| JP | 7-81459 | 3/1995 |
| JP | 9-126758 | 5/1997 |

* cited by examiner

*Primary Examiner*—Aung Moe
(74) *Attorney, Agent, or Firm*—Smith Gambrell & Russell

(57) ABSTRACT

An apparatus for adjusting a brightness balance of a stereoscopic camera includes a gain control amplifier and a micro-computer. The gain control amplifier adjusts a brightness balance of a pair of images outputted from the stereoscopic camera by gain. The micro-computer calculates a first evaluation value representing a magnitude of an entire brightness of a first evaluation window established in a reference image outputted from the gain control amplifier and calculates a second evaluation value representing a magnitude of an entire brightness of a second evaluation window established in a comparison image outputted from an adjusting device, and established in an area having a brightness correlation with the first evaluation window. Also, the micro-computer corrects a gain so as to reduce the difference between the first evaluation value and the second evaluation value.

14 Claims, 7 Drawing Sheets

DIRECTION OF STEREO MATCHING

BRIGHTNESS ADJUSTING APPARATUS FOR STEREOSCOPIC CAMERA

BACKGROUND OF THE INVENTION

1. Field of the Invention

The present invention relates to an apparatus for automatically adjusting a balance of brightness of a stereoscopic camera.

2. Discussion of the Background Art

In recent years, a stereoscopic vehicle surrounding monitoring apparatus using a pair of left and right cameras (stereoscopic camera having solid image element like CCD) mounted on the vehicle has been interested by automobile engineers. To detect a distance to an object, first respective picture element or pixel blocks having coincidence of brightness are found in left and right images (hereinafter referred to as stereo matching), then distance data are calculated according to the principle of triangulation from a relative deviation amount between both pixel blocks. Consequently, in order to calculate distance data with high reliability, it is necessary to balance the brightness between left and right cameras.

With respect to this, Japanese Patent Applications Laid-open No. Toku-Kai-Hei 5-114099 and No. Toku-Kai-Hei 5-265547 disclose a technique in which variations of output image signals which are caused by the difference of the output characteristic of stereoscopic cameras and the like, are corrected by referring to a lookup table. The lookup table is for changing gains and offset amounts of image signals and is stored in ROM of the system. Analogue image signals outputted from each camera are adjusted by the lookup table after being converted into digital signals by A/D converter. Thus, variations of image signals are corrected and the accuracy of the stereo matching is raised.

However, according to the aforesaid prior art, the lookup table is established individually for a given stereoscopic camera in the manufacturing process of the camera such that output characteristics of the left and right cameras agree with each other. The output characteristics of the stereoscopic camera, however, gradually deviate from the initially set value due to use environment or aged deterioration. Even if the output characteristic is well-balanced at the initial stage, that balance will be lost gradually, that is, the precision of the stereo matching degrades due to aged deterioration.

SUMMARY OF THE INVENTION

It is an object of the present invention to provide an apparatus for automatically adjusting a brightness balance of a stereoscopic camera to enhance the accuracy of monitoring around the vehicle. To achieve the object, the brightness adjusting apparatus comprises an adjusting means for adjusting the brightness balance by varying a gain, a distance data calculating means for finding a pixel block having a brightness correlation with a pixel block of a reference image in a comparison image and for calculating a distance data based on a city block distance between both pixel blocks, a distance data assigning means for assigning the distance data to the pixel block of the reference image, a first evaluation window establishing means for establishing a first evaluation window composed of a plurality of pixel blocks in the reference image, a parallax calculating means for calculating a parallax based on the distance data, a second evaluation window establishing means for establishing a second evaluation window composed of a plurality of pixel blocks in a comparison image based on the parallax, a first evaluation value calculating means for calculating a first evaluation value representing a magnitude of an entire brightness of the first evaluation window, a second evaluation value calculating means for calculating a second evaluation value representing a magnitude of an entire brightness of the second evaluation window and a correcting means for correcting the gain so as to reduce the difference between the first evaluation value and the second evaluation value.

DETAILED DESCRIPTION OF THE PREFERRED EMBODIMENTS

Figure 1:
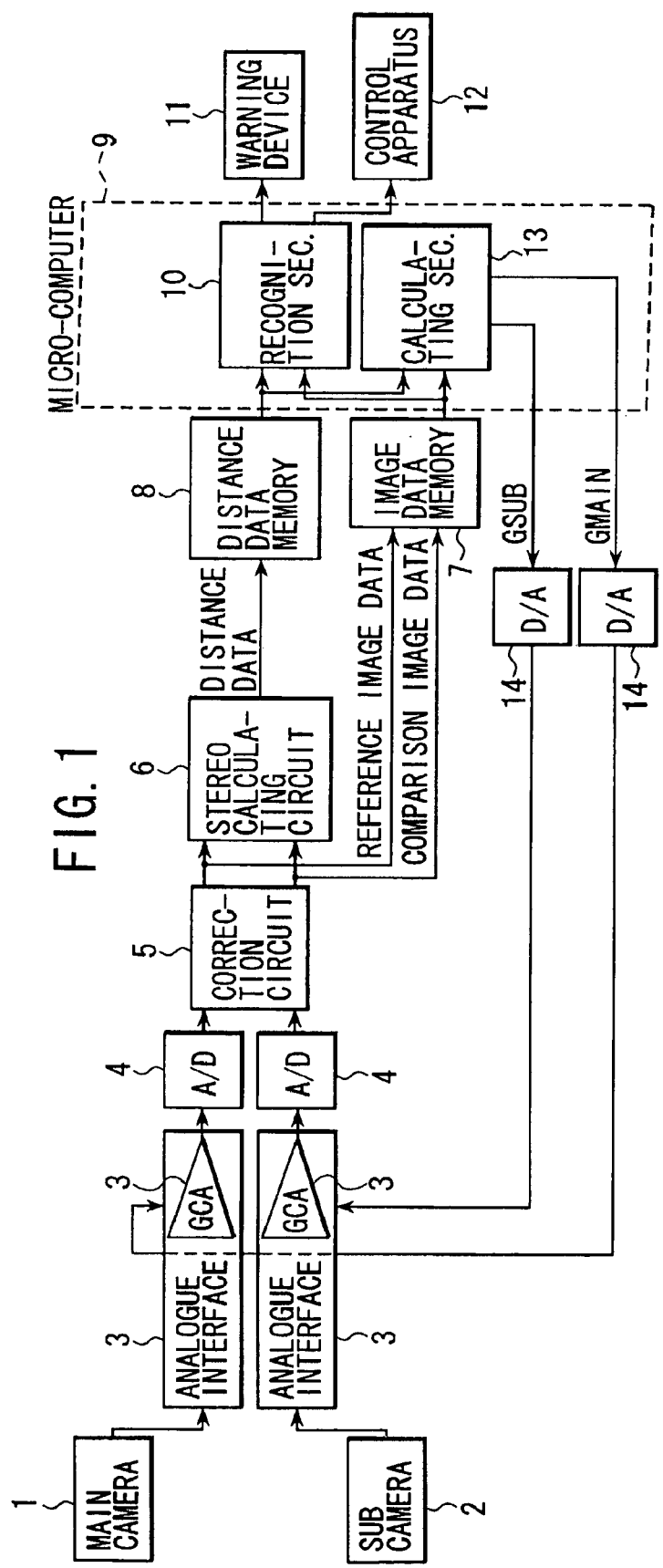
FIG. 1 is a block diagram showing a stereoscopic vehicle surrounding monitoring apparatus using an adjusting device according to an embodiment of the present invention.

Referring now to FIG. 1, a stereoscopic camera for imaging the surrounding scenery of a vehicle comprises a pair of CCD cameras 1, 2 disposed in the vicinity of a room mirror in the compartment. The CCD cameras 1, 2 are transversely mounted at a specified interval of distance. The camera 1 is referred to as a main-camera for obtaining reference images and is mounted on the right side when viewed from a driver. On the other hand, the camera 2 is referred to as a sub-camera for obtaining comparison images and is mounted on the left side when viewed from the driver. Analogue images which are outputted from the respective cameras 1, 2 in a synchronous timing are adjusted in respective analogue interfaces 3, 3 so as to coincide with the input range of the latter stage. A gain control amplifier (GCA) 3a in the analogue interface 3 serves as adjusting a brightness balance of a pair of analogue image signals. The gains of respective amplifiers 3a, 3a are established to values according to gain indicating values GMAIN, GSUB which are outputted from a micro-computer 9.

The pair of analogue images adjusted in the analogue interface 3 is converted into digital images having a specified number of graduations (for example, 256 graduations in the gray scale) by an A/D converter 4. The pair of digitalized images, that is stereo images, are subjected to processes such as a correction of brightness, a geometrical conversion of images and the like in a correction circuit 5. Generally, since there is greater or lesser degree of errors in the position of the stereoscopic cameras 1, 2, differences exist between left and right images. To remove these differences, affine transformation and the like is used to perform geometrical transformations such as rotation, parallel translation and the like. These processes ensure a coincidence of horizontal line which is an essential condition of the stereo matching between the left and right images. Through these image processes, reference image data composed of 512 pixels horizontally and 200 pixels vertically are generated from the output signals of the main camera 1. Further, comparison image data are generated from the output signals of the sub camera 2. The comparison image data have the same vertical length as the reference image data and a larger horizontal length than that of the reference image data. For example, the comparison image data are composed of 640 pixels horizontally and 200 pixels vertically. These reference and comparison image data are stored in an image data memory 7, respectively.

A stereo calculating circuit 6 calculates distance data based on the reference and comparison image data. Since one distance data is produced from one pixel block composed of 4×4 pixels, 128×50 distance data are calculated per one reference image of a frame size. With respect to a given pixel block in a reference image, a corresponding pixel block in a comparison image is identified by searching an area having the same brightness and the same pattern as that given pixel block of the reference image (stereo matching). The distance from the camera to an object projected in the stereo image is expressed as a parallax in the stereo image, namely a horizontal deviation amount between the reference and comparison images. Accordingly, the search is performed on the same horizontal line (epipolar line) as a j coordinate of the reference image. In the stereo calculating circuit 6, a correlation is evaluated between the object pixel block and the searching pixel block while shifting a pixel one by one on the epipolar line. The correlation between the object pixel block and the searching pixel block can be evaluated by calculating a city block distance for example. Basically, a pixel block whose city block distance is minimum is a pixel block having the correlation. The parallax between the object pixel block and the pixel block having the correlation is outputted as a distance data. Since Japanese Patent Application Laid-open No. Toku-Kai-Hei 5-114009 discloses a hardware constitution for calculating the city block distance, detailed description is omitted in this document. Thus calculated distance data of one frame are stored in a distance data memory 8.

The micro-computer 9 (recognition section 10) recognizes the road configuration (straight or curved road, curvature of road etc.), solid objects ahead of the vehicle (preceding vehicle, etc.) and the like. The recognition is performed based on the image data stored in the image data memory 7 and the distance data stored in the distance data memory 8. Further, other information not shown in the drawings such as information from a vehicle speed sensor, a steering sensor, a navigation system and the like, is referenced when it is necessary. Specific approaches as to how to recognize the road configuration and solid objects are disclosed in Unexamined Japanese Patent Application No. Toku-Kai-Hei 5-265547. According to the result of the recognition, when it is judged that an alarm is desired, a warning device 11 such as a monitoring apparatus, a speaker and the like operates to call a driver's attention. Further, by controlling a control apparatus 12 as needed, a vehicle control such as a shift-down of an automatic transmission, a slow-down of engine power, or a depression of brake pedal, is carried out.

Figure 2:
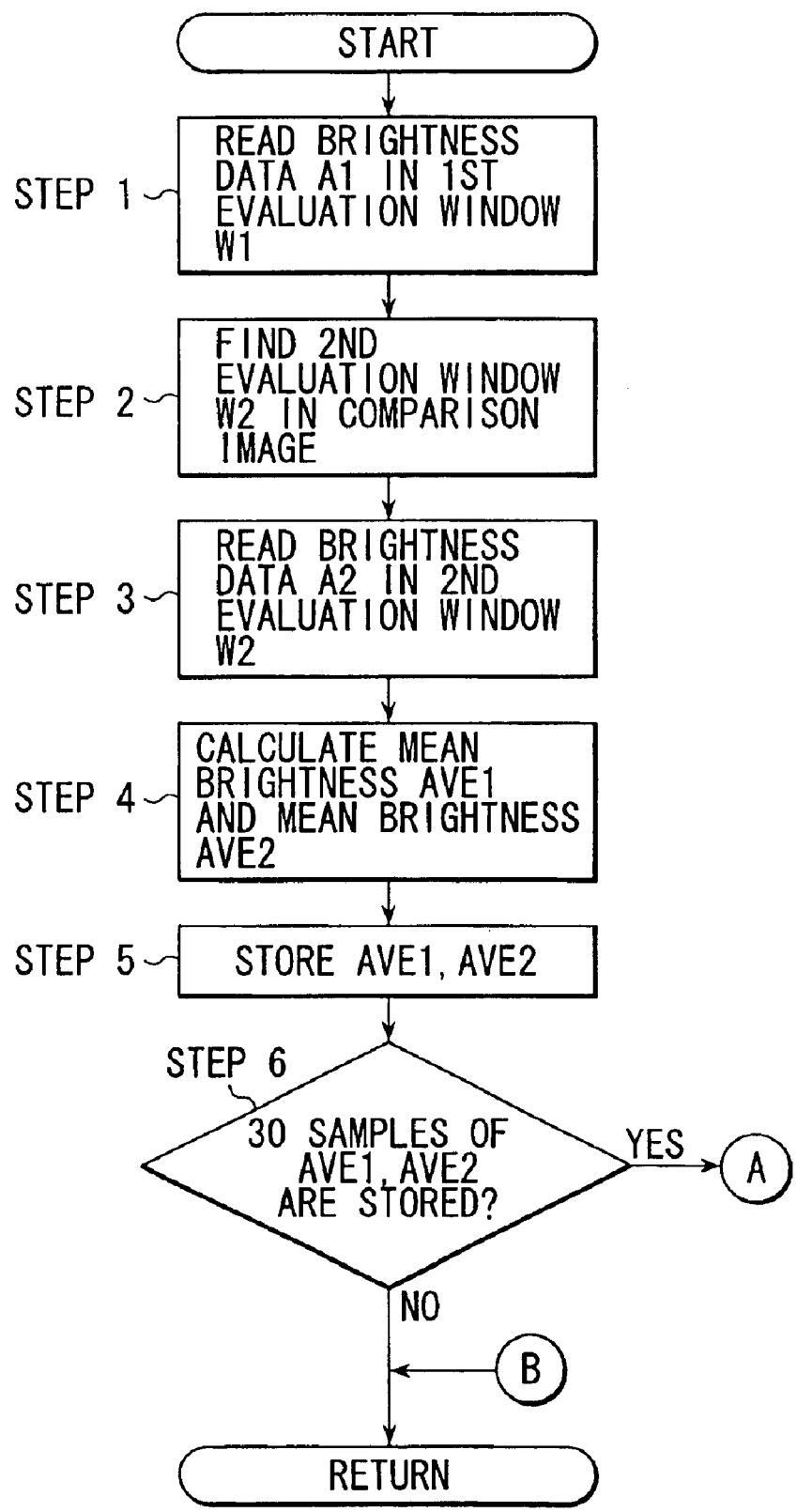
FIG. 2 is a flow chart showing processes for adjusting gains according to a first embodiment of the present invention.
Figure 3:
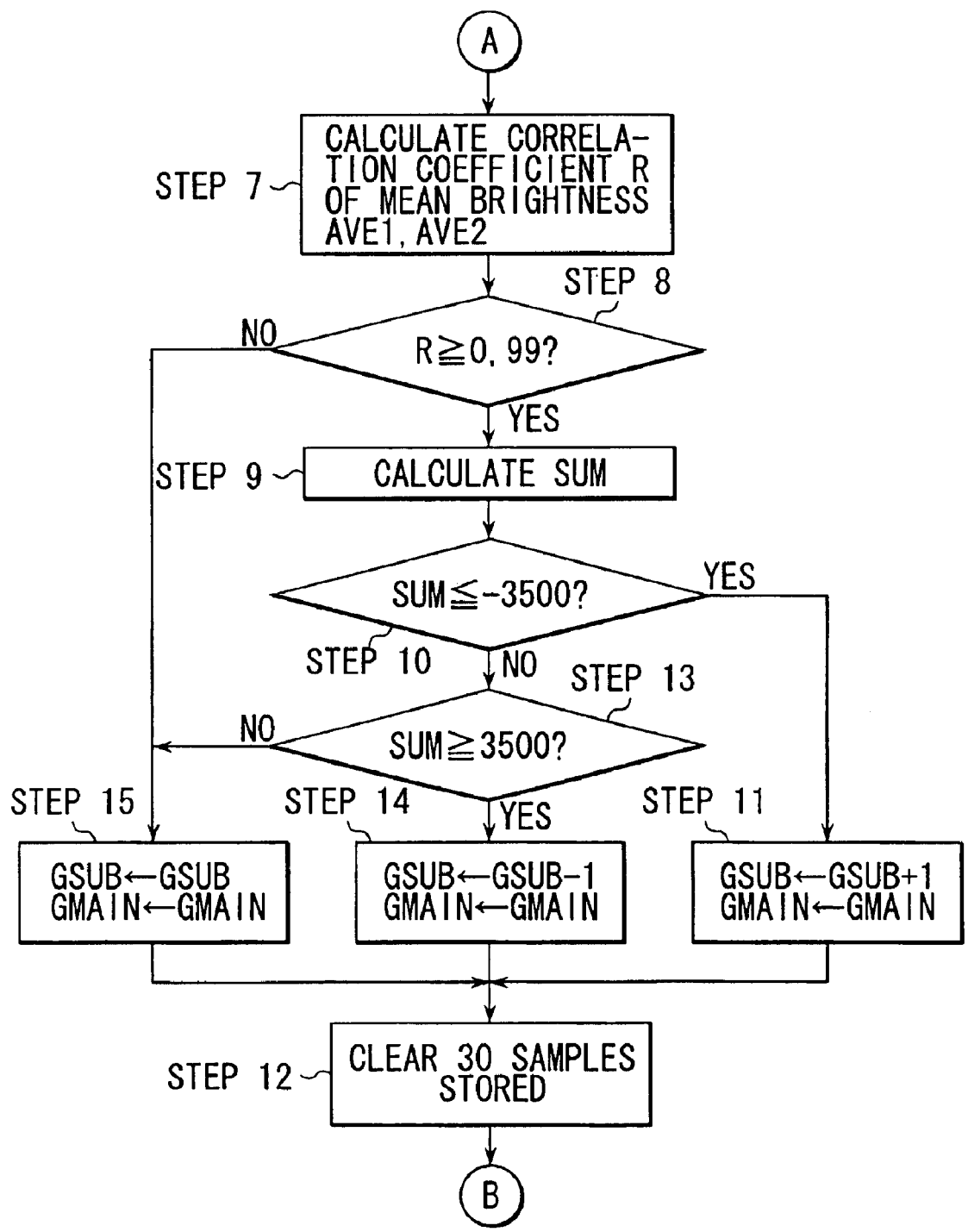
FIG. 3 is a flow chart continued from FIG. 2.

An operation according to a first embodiment will be described. A calculation section 13 of the micro-computer 9 performs a feed-back adjustment of a gain of the gain control amplifier 3a according to the flowcharts shown in FIGS. 2 and 3. These flowcharts are carried out repeatedly in every cycle of a specified time interval. The calculation section 13 calculates a main gain indicating value GMAIN for the main camera 1 and a sub gain indicating value GSUB for the sub camera 2, these values are converted into analogue values by D/A converters 14, 14 respectively and the converted analogue signals are inputted to the respective gain control amplifiers 3a, 3a.

Figure 4:
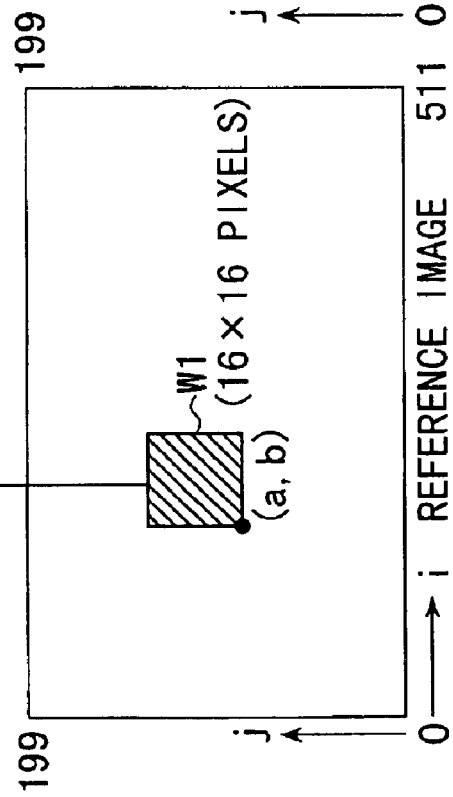
FIG. 4 is a diagram for explaining positions of a first and second evaluation windows according to a first embodiment.

First, at a step 1, a brightness data A1 of each pixel existing in a first evaluation window W1 established in the reference image is read. FIG. 4 is a diagram for explaining the establishment of the first evaluation window W1 and a second evaluation window W2 which will be described hereinafter. The first evaluation window W1 is constituted by 16×16 pixels and is fixed in a specified position ((a, b) in coordinates) in the reference image expressed by i–j coordinates. Consequently, a brightness data A1 having 256 pixels is read at this step. In this embodiment, the position of the first evaluation window is established in a relatively central area of the reference image, aiming at an object located 20 to 30 meters ahead of the vehicle.

Next, at a step 2, the second evaluation window W2 is found in the comparison image based on the distance data in the first evaluation window W1. As described before, since one distance data is calculated per one pixel block of 4×4 pixels, the first evaluation window W1 contains 16 distance data di (i=1 to 16). Based on these distance data di, a histogram is prepared and a value observed most frequently (most frequently observed distance value) is found in the histogram. Letting the value be a parallax $\chi$ between both windows W1, W2, the second evaluation window W2 having the same area (16×16 pixels) as the first evaluation window W1 is established at coordinates (a+$\chi$, b) in the comparison image as shown in FIG. 4. That is, the second evaluation window W2 is established being offset by the parallax in the horizontal direction from the position of the window W1. As another method of calculating the parallax $\chi$, there is a method of using a mean value of a plurality of the distance data di in the evaluation window W1. This method however sometimes has an inferior accuracy to the case of using the most frequently observed distance value.

Thus calculated second evaluation window W2 has a correlation with the first evaluation window W1 with respect to the brightness characteristic. The distance data of a given pixel block is a value indicating a correlation object of this pixel block (position of the correlation area in the comparison image). That is, if the distance data is determined, the correlation object of a given pixel block can be determined. Accordingly, if the respective distance data in the first evaluation window W1 have an adequate accuracy, the parallax $\chi$ calculated according to the aforegoing method is a highly reliable value showing a correlation object in the overall first evaluation W1.

On the other hand, it is possible to determine the position of the second evaluation window W2 without referring to the distance data di in the first evaluation window W1. In this case, the degree of correlation is evaluated overall area of 16×16 pixels while the evaluation is performed for every pixel one by one, starting from the basic point, coordinates (a, b) of the fist evaluation window on the epipolar line (j=b) in the comparison image in the stereo matching direction (in this embodiment, rightwards). When an area having a largest correlation is found, this area is established to be a second evaluation window W2. However, this method has a defect that the calculation amount needed for searching the correlation object of the first evaluation window W1 substantially increases, compared to the aforegoing method in which the distance data is used. The use of the distance data di existing in the first evaluation window W1 makes it possible to determine the correlation object of the first evaluation window W1 with less amount of calculation.

The program goes from the step 2 to a step 3, in which 256 pieces of brightness data A2 existing in the second evaluation window W2 are read. In order to evaluate the magnitude of overall brightness of the evaluation windows W1, W2, a mean brightness AVE1 of the first evaluation window W1 and a mean brightness AVE2 are calculated respectively (step 4). Here, the mean brightness AVE1 (or AVE2) is a mean value of the 256 brightness data A1 (or A2) read in the step 1 (or step 3). Further, thus calculated mean brightness AVE1, AVE2 are stored in RAM of the micro-computer 9 (step 5).

When it is judged at a step 6 that 30 samples of the mean brightness AVE1, AVE2 have been stored, the program goes to steps after a step 7, in which gain indicating values GMAIN, GSUB are subjected to adjusting processes. First, at the step 7 correlation coefficients R for evaluating the correlationship of the mean brightness AVE1, AVE2 of respective stored 30 samples are calculated. When the respective samples are expressed in (AVE1$i$, AVE2$i$ $i$=1 to 30), the correlation coefficient R in the entire samples can be calculated according to the following formula.

$$R = \frac{\Sigma(AVE1i - \overline{AVE1})(AVE2i - \overline{AVE2})/30}{\sqrt{\Sigma(AVE1i - \overline{AVE1})^2/30}\sqrt{\Sigma(AVE2i - \overline{AVE2})^2/30}} = \frac{\Sigma(AVE1i - \overline{AVE1})(AVE2i - \overline{AVE2})}{\sqrt{\Sigma(AVE1i - \overline{AVE1})^2}\sqrt{\Sigma(AVE2i - \overline{AVE2})^2}}$$

[Formula 1]

where $\overline{AVE1}$ is a mean value of 30 samples of the mean brightness AVE1 and $\overline{AVE2}$ is a mean value of 30 samples of the mean brightness AVE2.

Thus calculated correlation coefficient R is always within the range of $-1 \leq R \leq 1$. Under the ideal condition, the correlation coefficient R is equal to 1 and respective sample points (AVE1$i$, AVE2$i$) are on a straight line AVE2$i$=b *AVE1$i$+AVE2$i$+a (this relation is referred to as a complete correlation). In the real world, however, since the samples are affected by noises and the like, these sample points (AVE1$i$, AVE2$i$) scatter and as a result the correlation coefficient R becomes small. Accordingly, it is possible to evaluate the reliability of the stored sample data AVE1$i$, AVE2$i$ by calculating the correlation coefficient (step 8). In this embodiment, in case where the correlation coefficient R is equal to or smaller than 0.99, it is judged that the reliability of the stored data is low. In this case, the main gain indicating value GMAIN and the sub gain indicating value GSUB are not changed (step 15) so as not to make an improper adjustment of brightness balance. Furthermore, all of 30 samples stored in RAM of the micro-computer 9 are cleared (step 12) and the program goes to RETURN. On the other hand, in case where the correlation coefficient R is larger than 0.99, the stored data is judged to be reliable and the program goes to a step 9.

At a step 9, the total amount of the difference of mean brightness per each sample, SUM, a sum of the difference of the mean brightness per sample is calculated according to the following formula ($1 \leq i \leq 30$).

SUM=Σ(AVE1$i$–AVE2$i$)         [Formula 2]

The total amount of the difference of the mean brightness SUM is theoretically 0, if the brightness balance between the main camera 1 and the sub camera 2 is well-matched. However, in consideration of the stability of control, in case where the SUM is within a specified range (for example, –3500 to +3500), the present gain is judged to be in a proper condition. In this case, both the main gain indicating value GMAIN and the sub gain indicating value GSUB are not changed (steps 10, 13 and 15).

On the other hand, in case where the SUM is smaller than a negative threshold value (–3500), that is, in case where the comparison image outputted from the sub camera 2 is brighter than the reference image from the main camera 1, the program goes to a step 11 where 1 is added to the current sub gain indicating value GSUB and the main gain indicating value GMAIN is remained unchanged, that is, the current value GMAIN is used as it was. Since the added gain value makes the comparison image outputted from the sub camera 2 darker compared with the brightness before changing the gain, the unbalance of brightness between the cameras 1, 2 is adjusted in a reducing direction. Thus, the difference between the mean brightness AVE1 calculated in subsequent cycles of the first evaluation window W1 and the mean brightness AVE2 of the second evaluation window W2 becomes small. Then, the program goes to RETURN after at the step 12 the stored sample data are cleared.

When the current sub gain indicating value GSUB is added by 1, the sub gain indicating value GSUB sometimes goes beyond an allowable correction range (for example, –30 to +30). In this case, the sub gain indicating value GSUB is unchanged. That is, instead of adding 1 to the sub gain indicating value GSUB, 1 is subtracted from the current main gain indicating value GMAIN. Since the reference image outputted from the main camera 1 increases the brightness compared to the one before the change of gain, the brightness unbalance between the cameras 1, 2 is adjusted so as to be extinguished. Further, in case where both of the gain indicating values GMAIN, GSUB go beyond the allowable correction range, it is judged that the adjustment is impossible and neither values are not changed.

On the other hand, in case where the SUM is larger than a positive threshold value (+3500), that is, in case where the comparison image outputted from the sub camera 2 is darker than that of the main camera 1, the program goes to a step 14 where I is reduced from the current sub gain indicating value GSUB and the main gain indicating value GMAIN is used as it is the current one. As a result, since the comparison image outputted from the sub camera 2 becomes brighter than the one before changing the gain, the brightness unbalance is adjusted so as to be extinguished. Thus, the difference between the mean brightness AVE1 of the window W1 and the mean brightness AVE2 of the window W2 becomes smaller. Then, the program goes to RETURN after the sample data stored is cleared at the step 12.

When the current sub gain indicating value GSUB is reduced by 1, the sub gain indicating value GSUB sometimes goes beyond an allowable correction range. In this case, the sub gain indicating value GSUB is unchanged. That is, instead of reducing 1 from the sub gain indicating value GSUB, 1 is added to the current main gain indicating value GMAIN. Since the reference image outputted from the main camera 1 is darker than the one before changing the gain, the brightness unbalance between the cameras 1, 2 is adjusted so as to be extinguished.

Thus, since the feedback adjustment of the gain is performed in parallel with the monitoring control, the brightness balance of the stereo camera can be automatically adjusted. As a result of this, even if the initially set output characteristic of the stereo camera changes due to the aged deterioration or use environment, it is possible to adjust the balance of brightness of the stereo camera properly. The distance data calculated on the basis of thus obtained image signals can provide more accurate monitoring around the vehicle.

Further, in this embodiment, the position of the second evaluation window W2 which is the correlation object of the first evaluation window W1 is established based on the distance data existing in the first evaluation window W1. Since the second evaluation window W2 is established in the position calculated from this distance data, a deviation of the brightness balance of the stereo camera can be detected accurately. As described before, the distance data calculated with respect to a given small region (pixel block) indicates a correlation object of the small region. Accordingly, the most frequently appearing distance value of the distance data existing in the first evaluation window W1 which is an assembly of small regions, represents an overall correlation object of the first evaluation window W1. Thus, it is assured that both evaluation windows W1, W2 have approximately the same brightness characteristics under the normal condition. In other words, an existence of a deviation of brightness between both evaluation windows W1, W2 means that there is a brightness unbalance in the stereoscopic camera.

Further, the method of establishing the second evaluation window W2 based on the distance data in the first evaluation window W1 can reduce the quantity of calculation substantially, compared to the method of finding the correlation object of the first evaluation window W1 by searching an entire comparison image. As a result, the micro-computer 9 does not need so large a capacity. Further, this method has an advantage of being able to adjust the brightness balance in real time in parallel with the monitoring control around the vehicle.

Further, in this embodiment, the reliability of the mean brightness AVE1, AVE2 (sample data) is verified based on the correlation coefficient R. Only when it is judged that these sample data are highly reliable, the gain adjustment is executed. Accordingly, the gain adjustment can be performed properly without being affected by noises and the like.

There are also the following variations of the aforementioned embodiment.

Variation 1

Figure 5:
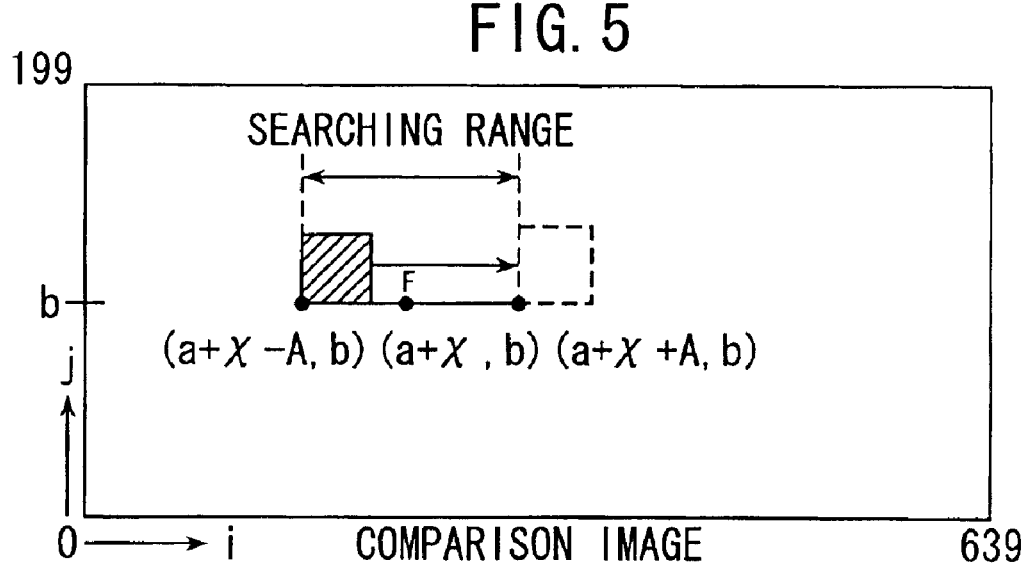
FIG. 5 is a diagram for explaining a searching range of a second evaluation window.

According to the embodiment described above, the parallax $\chi$ is obtained from the distance data di in the first evaluation window W1 and then the position of the second evaluation window W2 is established as coordinates $(a+\chi, b)$ based on the parallax $\chi$. That is, the position of the second evaluation window W2 is determined unconditionally from the calculated parallax $\chi$. On the other hand, according to a first variation, a searching range of the second evaluation window W2 is established from the calculated parallax $\chi$ and an area having a largest correlation in that range may be established as a second evaluation window W2. FIG. 5 is a diagram for explaining the searching range of the second evaluation window W2. Reference coordinates F $(a+\chi, b)$ are determined based on the parallax $\chi$ calculated from the distance data di of the first evaluation window. The searching range is established to be a range having a specified width extending on the epipolar line in the left and right direction respectively with reference to the reference coordinates F, that is, a range expressed in coordinates $(a+\chi \pm A, b)$. In the stereo matching, there is a precondition that the correlation object of the reference image is located on the same horizontal line in the comparison image as the reference image. Accordingly, the correlation object of the first evaluation window W1 can be found by searching over this searching range. According to this method, the calculation quantity needed for searching in the correlation area increases compared to the first embodiment. However, this method has an advantage that even when the distance data existing in the first evaluation window W1 has an inadequate reliability, the correlation object of the first evaluation window W1 can be properly identified.

Variation 2

Figure 6:
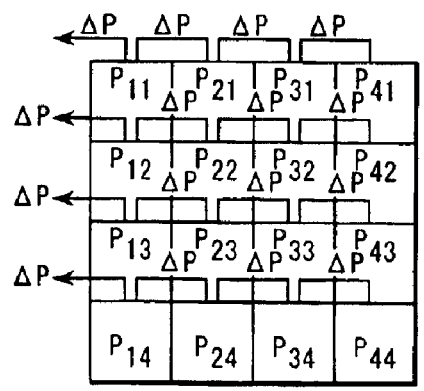
FIG. 6 is a diagram for explaining an evaluation method of a horizontal brightness edge (variation of brightness) in a pixel block.

As described before, in the stereo matching, the distance data is calculated by finding the pixel block of the comparison image having a correlation with the brightness characteristic of the pixel block of the reference image. Accordingly, in case of the pixel block having no feature in the brightness characteristic, particularly in brightness edges, the stereo matching fails frequently and the reliability of the distance data of the pixel block is not so high. In view of this, it is desirable to calculate the parallax $\chi$ using only the highly reliable data (that is, the distance data having brightness edges) among the distance data di of the first evaluation window W1. FIG. 6 is a view for explaining a method of evaluating brightness edges (variation of brightness) in the horizontal direction with respect to a pixel block. First, a variation (absolute value) of brightness $\Delta P_n$ (n=1 to 16) of a pair of two horizontally adjacent pixels is calculated. With respect to the far left pixel line $(P_{11}, P_{12}, P_{13}, P_{14})$, a variation of brightness $\Delta P$ is calculated from the far right line of a pixel block adjacent on the left. Next, the number of brightness variations exceeding a specified threshold value is counted from these 16 pieces of brightness variations. If the number of brightness variations exceeding the threshold value is equal to or smaller than 4, the pixel block has no specific feature in brightness and its distance data is judged to have a low reliability (invalid distance data). On the other hand, if the number of brightness variations exceeding the threshold value is larger than 4, the distance data of the pixel block is judged to be highly reliable (valid distance data). The parallax $\chi$ is calculated based upon only the valid distance data among the distance data di in the first evaluation window W1. The use of thus calculated parallax $\chi$ provides an establishment of the second evaluation window W2 in a more appropriate position. Accordingly, it is possible to calculate the sample data AVE1, AVE2 having a higher accuracy.

Variation 3

In the first embodiment, the first evaluation window W1 is fixed in a specified position. On the other hand, according to the variation 3, the position of the first evaluation window W1 may be varied. For example, an area having the largest number of the aforesaid valid distance data may be established to be a first evaluation window W1. According to this method, since an area including the most reliable valid distance data is selected as a first evaluation window W1, its correlation object can be precisely established.

Figure 7:
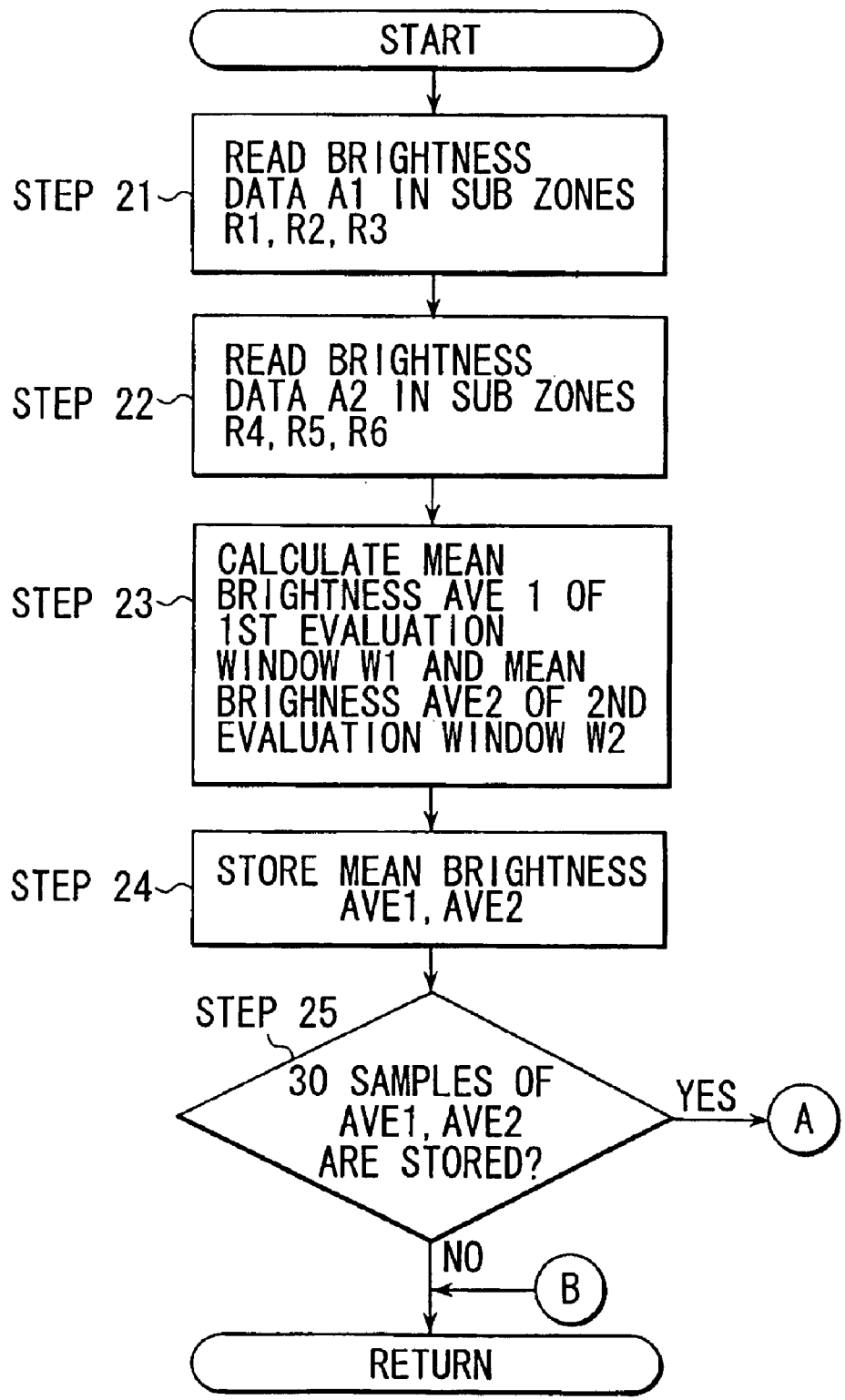
FIG. 7 is a flow chart showing processes for adjusting gains according to a second embodiment of the present invention.

FIG. 7 is a flowchart showing a process for adjusting a gain according to a second embodiment of the present invention.

In the flowchart, first at a step 21, brightness data A1 of sub zones R1, R2, R3 (hereinafter, referred to as first zones) constituting the first evaluation window W1 in the reference image are read. Further, at a step 22, brightness data A2 of sub zones R4, R5, R6 (hereinafter, referred to as second zones) constituting the second evaluation window W2 in the comparison image are read.

Figure 8:
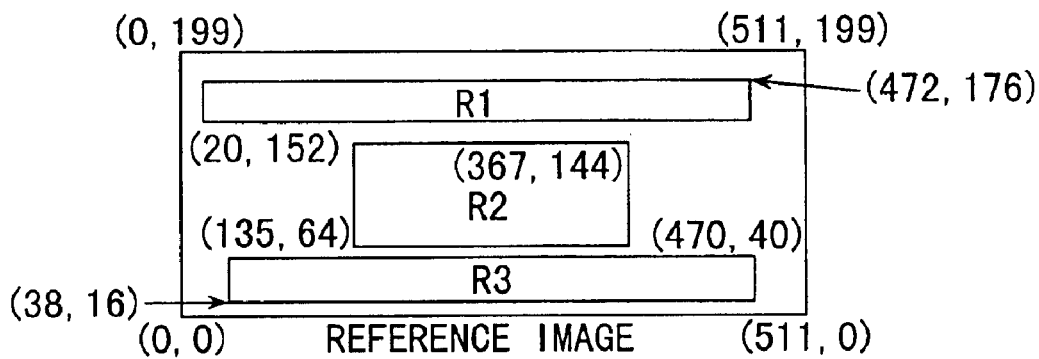
FIG. 8 is a diagram for explaining positions of a first and second evaluation windows according to a second embodiment.
Figure 8:
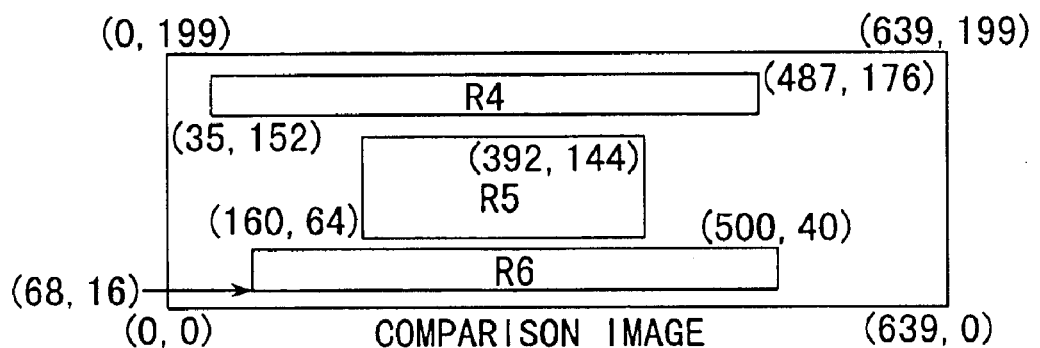
Figure 8:
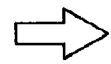

FIG. 8 is a diagram for explaining the establishment position of the first evaluation window W1 and the second evaluation window W2. The first zones R1, R2 and R3 positionally correspond to the second zones R4, R5 and R6, respectively. The positions of R4, R5 and R6 of the second zones are established, in consideration of the stereo matching, being offset slightly from the positions R1, R2 and R3 of the first zones in the direction of the stereo matching. The offset amount is established taking a general tendency with respect to the distance to objects which would be generally projected in the first zones R1, R2 and R3 into consideration.

When a vehicle monitors ahead of the vehicle during traveling, there is a tendency for the sky (infinite point) or solid objects in the relatively far distance (for example, buildings etc.) to be projected in the first zone R1 established on a relatively upper side of the reference image and in the second zone R4 corresponding to the first zone R1 in the comparison image. Accordingly, since parallaxes calculated in these zones R1, R4 tend to become relatively small, considering the tendency of the distance of solid objects and the like projected on the upper part of the image, the offset amount with respect to the second zones R4 is established to be smaller (or 0) beforehand. For example, as shown in FIG. 8, the second zone R4 is offset from the first zone R1 by the amount of 15 pixels in the stereomatching.

Further, since generally, there is a tendency for vehicles traveling ahead of the self vehicle and the like to be projected on the first zone R2 established in the middle part of the reference image and the second zone R5 positionally corresponding to the first zone R2, the parallax in the area tends to become medium. Consequently, taking the tendency of the scenery like this projected in the middle part of the image into consideration, the offset amount of the second zone R5 is established to be medium beforehand. According to the result of experiments with respect to this, the offset amount is preferably established to be a parallax corresponding to the distance 30 to 40 meters. For example, as shown in FIG. 8, the second zone R5 is offset from the first zone R2 by the amount of 25 pixels in the direction of the stereo matching.

Further, since generally, there is a tendency for the ground surface such as roads and the like to be projected on the first zone R3 established in the lower part of the reference image and the second zone R6 positionally corresponding to the first zone R3, the parallax in the area tends to become relatively large. Consequently, taking the tendency of the scenery like this projected in the lower part of the image into consideration, the offset amount with respect to the second zone R6 is established to be relatively large beforehand. For example, as shown in FIG. 8, the second zone R6 is offset from the first zone R3 by the amount of 30 pixels in the direction of the stereo matching.

Thus, the second zones R4, R5 and R6 are offset in the direction of the stereo matching in consideration of the general tendency of the distance to the objects projected in respective zones. As a result, since an identical scenery is projected respectively on a pair of zones (for example, R1 and R4) positionally corresponding of the reference image and the comparison image, both zones have almost the same brightness under normal imaging conditions.

At a step 23, the mean brightness AVE1 of the first evaluation window W1 and the mean brightness AVE2 of the second evaluation window W2 are calculated respectively. To reduce the calculation quantity, the mean brightness AVE1 is calculated from the brightness data A1 of every two horizontal lines in the first zone R1, R2 and R3. Further, similarly the mean brightness AVE2 is calculated from the brightness data A2 of every two horizontal lines in the second zones R4, R5 and R6. The mean brightness AVE1, AVE2 calculated in a certain cycle are stored in the RAM of the micro-computer 9 (step 24).

The processes from the step 21 to the step 24 are repeated in each cycle until 30 samples of the mean brightness data AVE1, AVE2 are stored. When the 30 samples of the mean brightness data AVE1, AVE2 are stored, the program goes from the step 25 of the cycle to the step 7 in the flowchart of FIG. 3. The processes after the step 7 are the same as those in the first embodiment and the description here is omitted.

Also in this embodiment, similarly to the first embodiment, since the brightness balance of the stereoscopic camera can be automatically adjusted so as to be in a proper condition, the accuracy of the surroundings monitoring can be enhanced.

Further, according to the second embodiment, differently from the first embodiment, the second evaluation window W2 is established without referring to the distance data. Accordingly, the brightness balance can be effectively adjusted under the condition that the stereoscopic camera has a relatively large brightness deviation or positional deviation, that is, under the condition that this makes it impossible to calculate the highly reliable distance data. Such condition happens for example in a stage of the initial setting of at shipping of a stereoscopic camera or in an event of a readjustment thereof due to dead battery-backup or the like.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A brightness adjusting apparatus for adjusting a brightness balance of a pair of images outputted from a stereoscopic camera having a first camera imaging a reference image and a second camera imaging a comparison image, comprising:

an adjusting means for adjusting said brightness balance by varying a gain;

a distance data calculating means for finding a pixel block having a brightness correlation with a pixel block of said reference image in said comparison image and for calculating a distance data based on a city block distance between both pixel blocks;

a distance data assigning means for assigning said distance data to said pixel block of said reference image;

a first evaluation window establishing means for establishing a first evaluation window composed of a plurality of pixel blocks in said reference image;

a parallax calculating means for calculating a parallax based on said distance data;

a second evaluation window establishing means for establishing a second evaluation window composed of a plurality of pixel blocks in said comparison image based on said parallax;

a first evaluation value calculating means for calculating a first evaluation value representing a magnitude of an entire brightness of said first evaluation window;

a second evaluation value calculating means for calculating a second evaluation value representing a magnitude of an entire brightness of said second evaluation window; and a correcting means for correcting said gain so as to reduce the difference between said first evaluation value and said second evaluation value.

2. The apparatus according to claim 1, wherein said second evaluation window is established in a horizontally offset position from said first evaluation window.

3. The apparatus according to claim 1, wherein said parallax is calculated based on a histogram of said distance data.

4. The apparatus according to claim 1, wherein said parallax is calculated based on a mean value of said distance data.

5. The apparatus according to claim 1, wherein said second evaluation window is established in a horizontally offset position by an amount of said parallax from said first evaluation window.

6. The apparatus according to claim 1, further comprising:

a correlation coefficient calculating means for calculating a correlation coefficient based on said first evaluation value and said second evaluation value.

7. The apparatus according to claim 6, wherein said first evaluation value and said second evaluation value are verified by said correlation coefficient.

8. The apparatus according to claim 1, wherein said second evaluation window is established by finding a pixel block having a largest brightness correlation with a pixel block of said first evaluation window in said comparison image within a specified range on the basis of a reference point established based on said parallax.

9. The apparatus according to claim 1, wherein said parallax is calculated only based on said distance data of a pixel block having a larger variation of brightness than a threshold value.

10. The apparatus according to claim 1, wherein said first evaluation value and said second evaluation value are calculated from at least one pair of first and second zones prepared in said reference image and said comparison image, respectively and said pair of zones are established being horizontally offset by an amount of pixels according to the position of said zones.

11. The apparatus according to claim 10, wherein said amount of pixels are established in consideration of a tendency of a distance to an solid object projected in said first zones.

12. A brightness adjusting apparatus for adjusting a brightness balance of a pair of images outputted from a stereoscopic camera having a first camera imaging a reference image and a second camera imaging a comparison image, comprising:

an adjusting means for adjusting said brightness balance by varying a gain;

a first evaluation window establishing means for establishing a first evaluation window composed of a plurality of pixel blocks of said reference image;

a second evaluation window establishing means for establishing a second evaluation window composed of a plurality of pixel blocks of said comparison image;

a first evaluation value calculating means for calculating first evaluation value representing a brightness magnitude of said first evaluation window established in said reference image;

a second evaluation value calculating means for calculating a second evaluation value representing a brightness magnitude of said second evaluation window established in said comparison image; and a correcting means for correcting said gain so as to reduce the difference between said first evaluation value and said second evaluation value, wherein said second evaluation window is established with offset amount in the direction of the stereo matching against a position of said first evaluation window, said offset amount being established taking a tendency with respect to a distance to object which is projected in said first evaluation window.

13. A brightness adjusting apparatus for adjusting a brightness balance of a pair of images outputted from a stereoscopic camera having a first camera imaging a reference image and a second camera imaging a comparison image, comprising;

an adjusting means for adjusting said brightness balance by varying a gain;

a first evaluation window establishing means for establishing a first evaluation window composed of a plurality of pixel blocks of said reference image;

a second evaluation window establishing means for establishing a second evaluation window composed of a plurality of pixel blocks of said comparison image;

a first evaluation value calculating means for calculating a first evaluation value representing a brightness magnitude of said first evaluation window established in said reference image;

a second evaluation value calculating means for calculating a second evaluation value representing a brightness magnitude of said second evaluation window established in said comparison image; and a correcting means for correcting said gain so as to reduce the difference between said first evaluation value and said second evaluation value, wherein said first evaluation window is composed of plurality of first zones prepared in said reference image each of said first zones is established at difference part of said reference image, said second evaluation window is composed of plurality of second zones prepared in said reference image, said second zones being established to correspond to respective first zones, each of said second zones being established with an offset amount with respect to a corresponding first zone, in the direction of stereo matching, said offset amount being potentially different for each of said second zones.

14. A brightness adjusting apparatus according to claim 13, wherein said difference part of said reference image includes an upper part, a middle part, and a lower part of said reference image.

* * * * *